March 10, 1959 G. E. KAUFMAN 2,877,001
FOOD MIXER
Filed Feb. 8, 1954 2 Sheets-Sheet 1

United States Patent Office 2,877,001
Patented Mar. 10, 1959

2,877,001

FOOD MIXER

George E. Kaufman, Canton, Ohio, assignor to The Hoover Company, North Canton, Ohio, a corporation of Ohio Application February 8, 1954, Serial No. 408,870

9 Claims. (Cl. 259—84)

The present invention relates to food mixers and more particularly to adjusting the position of the beaters for use in bowls of different sizes.

An object of the invention is to provide a food mixer in which the mixer unit is rotatably mounted to position the beaters along the side wall of mixing bowls of any size. A further object is to provide a food mixer having a frictional drive connection with the bottom wall of the bowl to bodily displace the beaters toward one side of the bowl to automatically position the beaters in the bowl. Another object is to provide a food mixer in which the mixer unit operates a member to displace the beaters to adjacent one side of the bowl to position the beaters in bowls of various diameters. Still another object is to provide a food mixer in which a frictional member is positioned at an angle to the bottom wall of the bowl for driving engagement therewith to displace the beaters into proper position adjacent one side of the bowl regardless of the size of the latter. Other objects and advantages of the invention will become apparent from the following description and drawings wherein:

Figure 2:
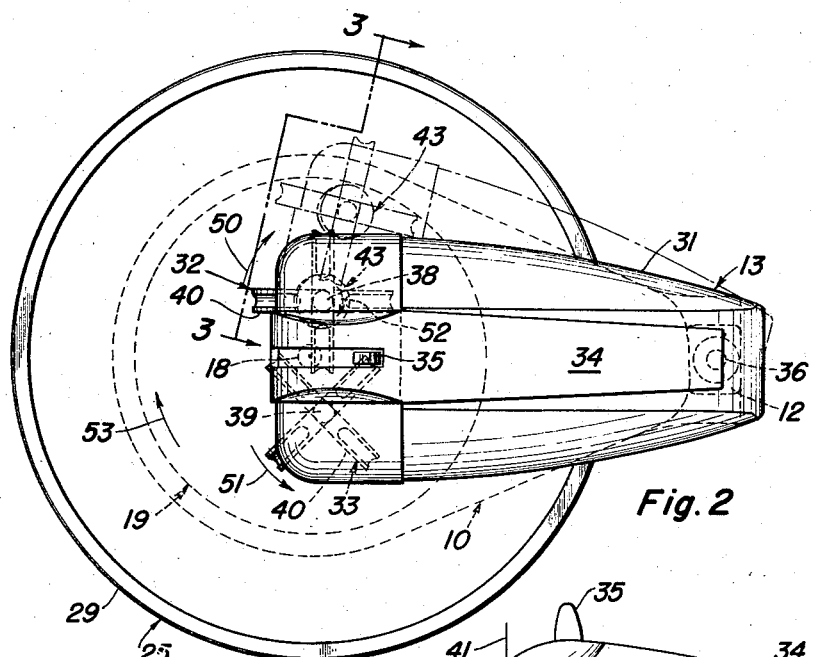
Figure 2 is a top plan view showing the different positions of the mixing unit in full and dotted lines.

The embodiment of the invention herein disclosed comprises a base 10 having a flat circular platform 11, and arranged diametrically thereof is a standard 12 on which is mounted a mixer unit 13. Extending through an opening in the center of the platform 11 is a bearing housing 14 having an annular rib 15 retained in a shouldered recess 16 by a bracket 17 riveted to the platform 11. Rotatably mounted in the housing 14 is a spindle 18 on a turntable 19 which overlies the platform 11. A thrust washer 20 seats against the upper end of the housing 14, and the turntable is removably mounted on the platform 11 by a split ring 21 engaging a recess in the spindle 18 below the lower end of the housing 14.

Figure 1:
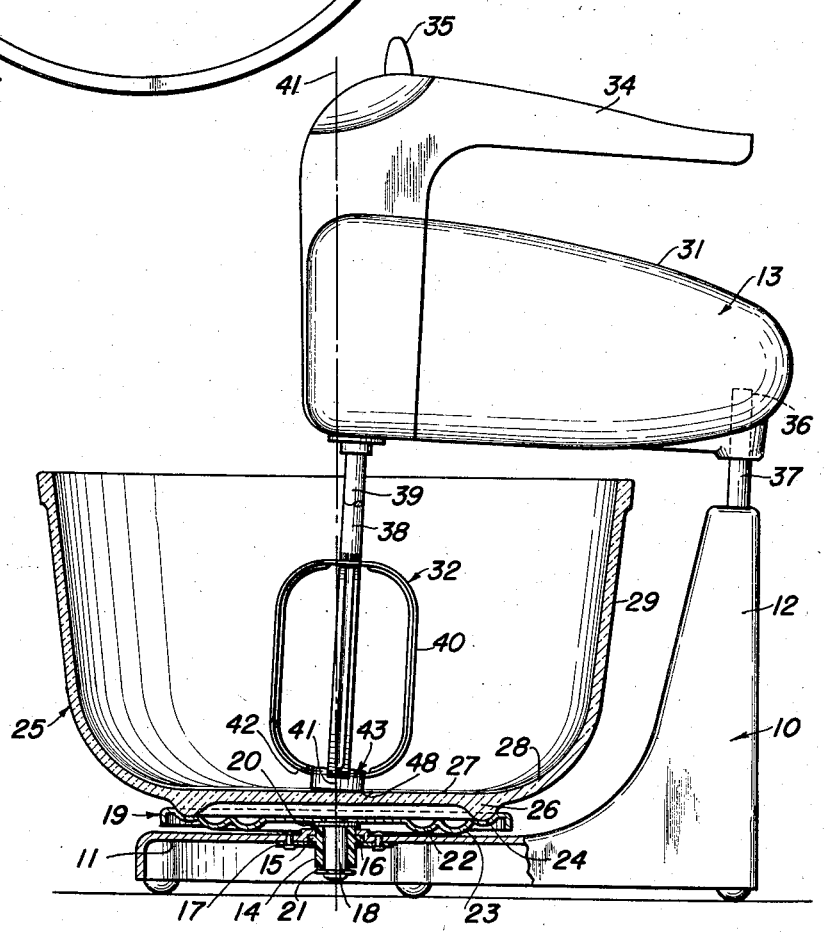
Figure 1 is a side view partly in section showing the driving disc arranged at an angle to the bottom wall of the bowl.

The turntable 19 is provided with three annular depressions 22, 23 and 24 concentric with the platform spindle 18 for receiving an annular flange on mixing bowls of different sizes. As shown in Figure 1, a mixing bowl 25 is provided with an annular flange 26 seated in the outer depression 24 to support the bowl on the turntable. The bowl 25 has a flat bottom wall 27, a curved corner portion 28 and a side wall 29. It will be noted the turntable 19 rotatably supports the bowl 25, regardless of its size, on the center of the platform 11 and diametrically opposite the motor on the standard 12.

The mixing unit 13 includes an unshown motor having a housing 31 which encloses unshown gearing for two beaters 32 and 33 suitably removably secured in the housing and driven by the motor. A carrying handle 34 is formed on the housing 31, and a switch 35 is provided for controlling the unshown motor to rotate the beaters 32 and 33. A bearing socket 36 is formed in the rear end of the housing 31 and rotatably rests on a pin 37 projecting from the standard 12, whereby the entire mixing unit 13 is mounted for pivotal movement about the pin 37 parallel to the spindle 18 and disposed diametrically opposite the center of rotation of the turntable 19 and the bowl 25.

Each of the beaters 32—33 includes a center shaft 38 and 39, respectively, and has interfitting beater blades 40. The shafts 38—39 of the beaters are mounted at their upper ends to the gearing in the housing 31 to position the axes of the beaters 32—33 at an angle to the bottom wall 27 of the bowl and rearwardly of a vertical line 41—41 passing through the center of the lower end of the beaters 32 and 33, as shown in Figure 1.

Suitably attached to the lower end 42 of the beater 32 is a friction disc 43 having a bottom face 44, an annular edge 45, and a side face 46. The disc 43 may be formed of plastic or other suitable friction material which is unaffected by foods and does not mar the bowl 25. The disc 43 is arranged concentric with the axis of the beater shaft 38 and the bottom face 44 is inclined with respect to the wall 27 of the bowl so that only a small portion 48 of the annular edge 45 rests on the bowl bottom wall 27 during rotation of the disc.

The edge 45 of the disc 43 is held in frictional engagement with the bowl bottom wall 27 by supporting part of the weight of the mixer unit 13 overhanging the bowl 25. If desired, suitable mechanism may be provided on the motor support pin 37 or the beater shafts 38—39 to adjust the disc 43 relative to the bottom of the bowl to obtain the desired frictional engagement with bowls of various sizes.

In operation, the bowl 25 is seated in the depression 24 on the turntable 19, the material to be mixed is placed in the bowl, and the mixer unit 13 arranged as shown in Figure 1 with the unit 13 partly supported by the socket 36 seated on the pin 37 and the edge 45 of the disc 43 resting on the bottom wall of the bowl 25. The beaters 32—33 may be arranged in any position with respect to the annular side wall 29 of the bowl, for example approximately in the center of the bowl, as shown in full lines in Figure 2. The lower ends of the beater blades 40 are spaced from the bottom wall of the bowl 25 and only the portion 48 of the disc 43 rests on the bowl bottom 27.

Movement of the switch 35 to its "on" position energizes the motor which rotates the beaters 32—33 in opposite directions, as indicated by the arrows 50 and 51 in Figure 2. The disc 43 rotates with beater 32 and, due to the inclination of the shaft 38 only the portion 48 of the circular edge 45 contacts the bottom wall 27 of the bowl and thus exerts a force in one direction, laterally towards the center of the bowl as indicated by the arrow 52 in Figure 2. The frictional force applied by the edge portion 48 on the bowl bottom wall 27 during rotation of the shaft 38 sets up a reacting force on the mixing unit 13 to pivot the latter clockwise about the pin 37 and move both beaters 32—33 laterally toward the side wall 29 of the bowl 25.

Figure 3:
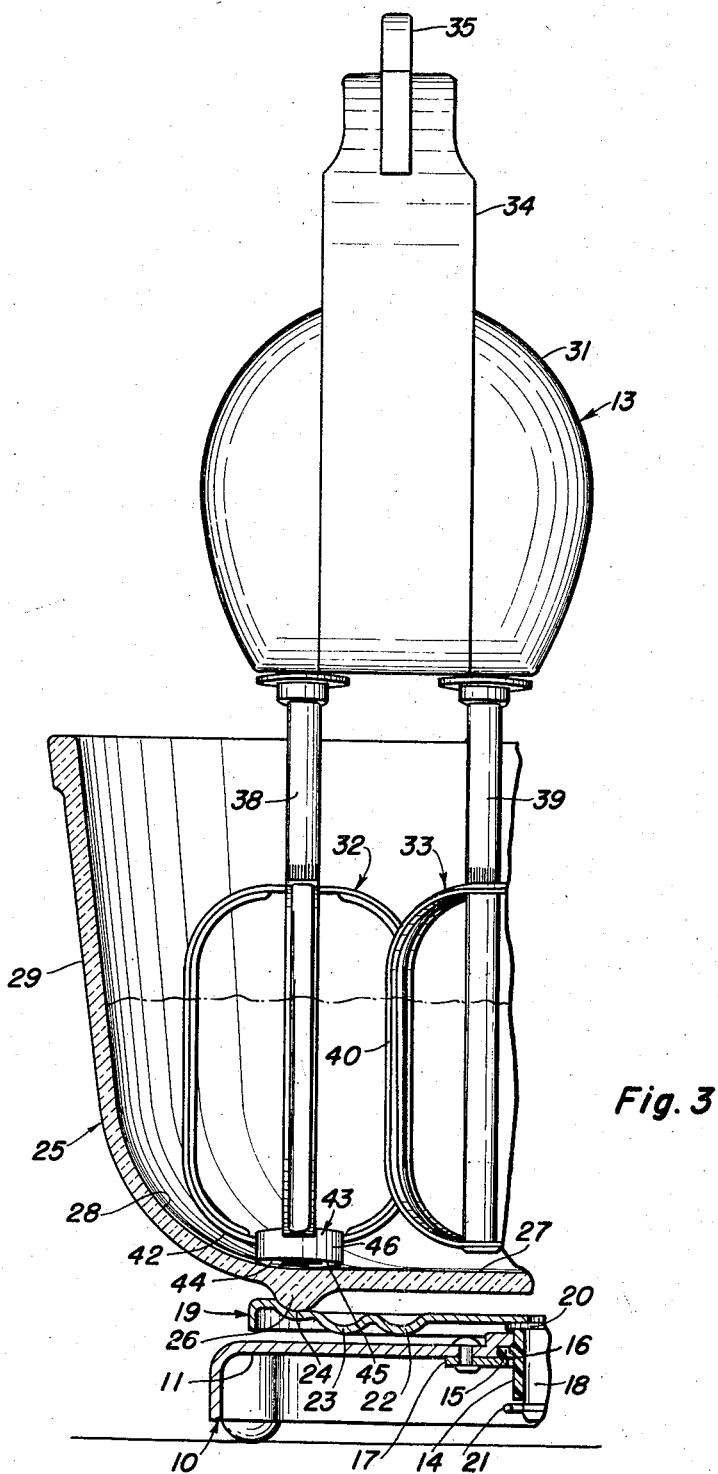
Figure 3 is a section along the line 3—3 of Figure 2.

The beaters 32—33 continue to move toward the bowl side wall 29 until the circular edge 45 of the disc 43 contacts the arcuate surface of the bowl corner 28, which prevents further displacement of the beaters 32—33 to thereby properly position the latter in the bowl as shown in dotted lines in Figure 3 to mix the material. In this position of the beaters the circular edge 45 of the revolving disc 43 engages the corner 28 of the bowl 25 to exert a force thereon causing the bowl 25 and turntable 19 to rotate on the spindle 18 in the direction indicated by the arrow 53. The reaction of the beaters with the material to be mixed and the side 29 of the bowl also assist in rotating the turntable 19 and the bowl 25.

If a bowl of smaller diameter is used and is seated for example in the turntable depression 22, the portion 48 of the disc 43 will frictionally engage the bowl bottom wall to pivot the mixing unit 13 and move the beaters 32—33 to proper mixing position adjacent the bowl side wall, and the smaller bowl will rotate about the spindle 18.

From the foregoing it will be seen that I have provided a food mixer wherein bowls of different sizes are always rotated about one stationary axis 18. The rotating friction disc 43 sets up a reaction with the bowl to displace the beaters 32—33 laterally of the bowl to automatically adjust the beaters to the proper position in bowls of different sizes.

While I have shown and described but a single embodiment of my invention, it is to be understood that this embodiment is to be taken as illustrative only and not in a limiting sense. I do not wish to be limited to the particular structure shown and described but to include all equivalent variations except as limited by the scope of the claims.

I claim:

1. A food mixer comprising a mixing bowl, a beater, means mounting said beater in said bowl for lateral displacement toward the side wall of said bowl, friction means including a disc operatively connected with said beater and supported in an inclined position relative to the bottom wall of said bowl whereby only a portion of said disc is in frictional driving engagement with said bottom wall of said bowl, and means moving said friction means in said driving engagement with said bottom wall to displace said beater laterally toward side wall of said bowl.

2. A food mixer comprising a mixing bowl, a beater, means mounting said beater in said bowl for lateral displacement toward the side wall of said bowl, friction means including a disc operatively connected with said beater and supported for rotation on an axis inclined relative to the bottom wall of said bowl whereby only a portion of said disc is in frictional driving engagement with said bottom wall of said bowl, and means for rotating said friction means in said driving engagement with said bottom wall to displace said beater laterally toward said side wall of said bowl.

3. A food mixer comprising a mixing bowl, a beater, means mounting said beater in said bowl for lateral displacement toward the side wall of said bowl, friction means including a disc operatively connected with said beater and supported in an inclined position relative to the bottom wall of said bowl whereby only a portion of said disc is in frictional driving engagement with said bottom wall of said bowl, and means moving said friction means in one direction in said driving engagement with said bowl to displace said beater laterally in an opposite direction toward said side wall of said bowl.

4. A food mixer comprising a mixing bowl, a beater rotatable in said bowl, means mounting said beater for lateral displacement in said bowl, friction means including a disc supported on said beater in an inclined position relative to the bottom wall of said bowl whereby only a portion of said disc is in frictional driving engagement with said bottom wall of said bowl, and means rotating said beater and friction means for moving the latter in said driving engagement with said bottom wall to displace said beater and friction means laterally toward the side wall of said bowl.

5. A food mixer comprising a mixing bowl, means supporting a beater in said bowl for rotation about an axis inclined to the bottom wall of said bowl, means mounting said beater for lateral displacement in said bowl, and disc means supported for rotation on said inclined beater and having inclined contact with the bottom wall of said bowl whereby only a portion of said disc is in frictional engagement with said bottom wall to displace said beater and disc means laterally toward the side wall of said bowl.

6. A food mixer according to claim 1, and means on said bowl engageable with said friction means to limit said lateral displacement of said beater toward said side wall.

7. A food mixer for large and small mixing bowls, a turntable mounted for rotation about one axis, seating means on said turntable to seat said large bowl or said small bowl, said seating means being concentric with said one turntable axis for rotation of selected one of said bowls about said one axis, beater means adapted to be placed in selected one of said bowls, means mounting said beater means for displacement toward the side wall of selected one of said bowls, friction means including disc means operatively connected to said beater means and supported in an inclined position relative to the bottom wall of said bowls whereby only a portion of said disc means is in driving engagement with said bottom wall of selected one of said bowls, and means moving said friction means in said driving engagement to displace said beater means toward the side wall of selected one of said bowls with the latter supported on said one turntable axis.

8. A food mixer comprising a rotatable mixing bowl, a beater, means mounting said beater in said bowl for lateral displacement against the side wall of said bowl, friction means including a disc operatively connected with said beater and supported in an inclined position relative to the bottom wall of said bowl whereby only a portion of said disc is in frictional driving engagement with said bottom wall of said bowl, and means rotating said friction means in said driving engagement with said bottom wall to displace said beater laterally against said side wall of said bowl, said rotating friction means when arranged against said side wall exerting a force thereon to rotate said bowl.

9. A food mixer comprising a bowl, a turntable supporting said bowl and mounted for rotation about one axis, beater means adapted to be placed in said bowl, means mounting said beater means for displacement in said bowl about an axis parallel to said one turntable axis, and disc means operatively connected with said beater means and supported in an inclined position relative to the bottom wall of said bowl whereby only a portion of said disc means is in frictional driving engagement with said bottom wall of said bowl to displace said beater means about its said axis toward the side wall of said bowl.

References Cited in the file of this patent

UNITED STATES PATENTS

| 2,008,184 | Mross | July 16, 1935 |
| 2,069,506 | Ross | Feb. 2, 1937 |
| 2,552,054 | Misic | May 8, 1951 |
| 2,552,972 | Jepson | May 15, 1951 |